March 10, 1953 C. O. GLASGOW ET AL Re. 23,628

MEANS FOR HEATING VESSELS

Original Filed Sept. 19, 1947 3 Sheets-Sheet 1

INVENTORS
Clarence O. Glasgow
BY Joseph L. Maher
Ashley & Ashley
ATTORNEYS

March 10, 1953 C. O. GLASGOW ET AL Re. 23,628

MEANS FOR HEATING VESSELS

Original Filed Sept. 19, 1947 3 Sheets-Sheet 2

INVENTORS
Clarence O. Glasgow
BY Joseph L. Maher
Ashley & Ashley
ATTORNEYS

MEANS FOR HEATING VESSELS

Original Filed Sept. 19, 1947 3 Sheets-Sheet 3

INVENTORS
Clarence O. Glasgow
BY Joseph L. Maher
Ashley & Ashley
ATTORNEYS

Reissued Mar. 10, 1953

Re. 23,628

UNITED STATES PATENT OFFICE 23,628

MEANS FOR HEATING VESSELS

Clarence O. Glasgow and Joseph L. Maher, Tulsa, Okla., assignors to National Tank Company, Tulsa, Okla., a corporation of Nevada Original No. 2,579,184, dated December 18, 1951, Serial No. 775,119, September 19, 1947. Application for reissue August 22, 1952, Serial No. 307,402

22 Claims. (Cl. 210—52.5)

Figure 1:
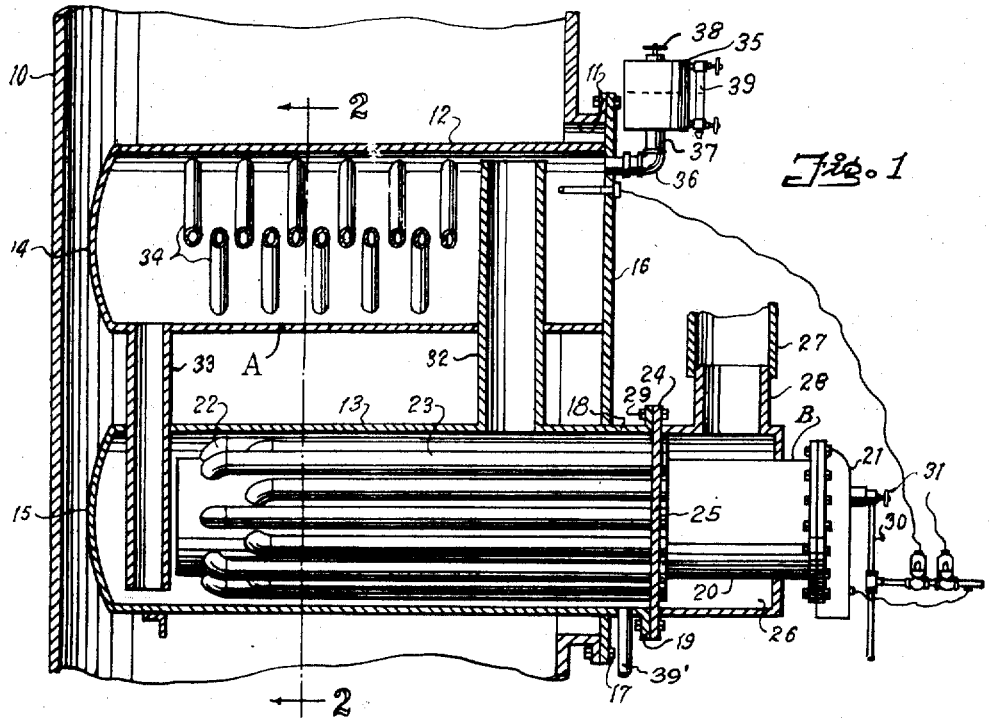

Matter enclosed in heavy brackets [ ] appears in the original patent but forms no part of this reissue specification; matter printed in italics indicates the additions made by reissue.

This invention relates to new and useful improvements in systems and means for heating vessels.

The structures disclosed in this application are similar to those disclosed in our co-pending applications, Serial No. 775,118 and Serial No. 775,120, both filed September 19, 1947, and reference is made thereto.

Heretofore, many methods for heating vessels, such as tanks, have been utilized in the petroleum industry, since it is often necessary to heat the contents of settling or storage tanks as well as the fluids passing through emulsion treaters and other types of treating equipment. While the present invention is directed primarily to use with emulsion treaters and is adapted to overcome a large percentage of the difficulties encountered in such use, it may also be employed with advantageous and desirable results in other instances, such as in flow heaters and settling tank heaters. The invention is not to be limited to a specific use since its new and novel principles may be followed in a multitude of applications wherein uniform heating with substantial freedom from undesirable effects is desired, such as preventing formation of scale while heating of fluids containing large amounts of solids.

Various solutions to the problem of providing suitable vessel heaters have been developed including the injection of certain chemicals to prevent scaling and corrosion as well as provision of zinc and other metals or dissimilar metals in combination within the vessel. Also the use of corrosion-resisting steel alloys has been practiced but obviously, the expense involved in this method is usually prohibitory and only the corrosion problem is solved. Where steam is available in sufficient quantities, steam heaters or coil bundles for steam have been used to advantage. However, neither of these alternatives is satisfactory for isolated vessels, or for locations where steam is not available. Manifestly, the provision of a boiler for the supplying of steam merely to heat a single vessel is not feasible, particularly on account of the unusual radiation losses, and a boiler is practical and economical only if insulated at considerable expense and requires constant and separate attention as well.

It has been the practice heretofore to employ a simple gas-fired heater which extends into the interior of the vessel and heats the contents thereof by direct thermal conduction from the combustion gases through the wall of the heater to the liquid within the vessel, and without radiation losses therefrom. Necessarily, the well temperature of the heater is high and this contacting of hot metal with a corrosive liquid, such as crude petroleum, may and frequently does create an extremely severe scaling and corrosion problem. There are almost invariably "hot spots" in the wall of the heater and additionally accelerated scaling and corrosion occurs at these points. Consequently, such heaters rapidly deteriorate and must be replaced within a relatively short period. And also, when and as such liquids are heated, usually a large amount of precipitate in the form of scale is formed and attaches itself to the outer wall of the heater and continues to build up until it becomes so thick that it is impossible for the heat to be transferred through the metal and the scale to the fluids and consequent failure of the heater occurs due to melting.

Since many vessels, especially in the petroleum industry, are located at isolated points, the usual more elaborate heating procedures are not usable. As many, or most, of these points have natural gas, or other fuel, readily available, it is an obvious step to utilize this fuel for heating purposes. However, the severe corrosion and scaling problems set forth hereinbefore have rendered this expedient unsatisfactory in many cases. In addition, the fluid being heated is usually adversely affected by the high temperature of the heater, due to the effect of higher temperatures causing an unusually high release and consequent loss of valuable components which would not be evolved when using the method herein described. This is especially true when crude petroleum would make up a part of the fluids being heated. The hydrocarbons present in such fluid are broken down or cracked to some extent in the high temperature film of fluid which encases the heater. Thus, gases are evolved which otherwise would not be lost, and the precipitate tends to "coke" and to partially cover the heater itself with a carbonaceous deposit. Fluids having material in suspension or solution are apt to deposit this material on the heater as said fluids are subjected to the excessive temperatures. Often, fluid systems including several liquid phases with gases and solids dissolved therein must be heated, as in petroleum emulsion treaters. These systems verge on instability and must be carefully processed to permit only the desired stratification and precipitation to take place. Usually, the ordinary heater causes excessive precipitation and degasification in such a system so that inefficient results are obtained. The loss of volatile components and cracking of other components represent a needless but heretofore unavoidable waste. At the same time, the deposit of "coke" and other solids on the heater hastens its deterioration while impairing its heating efficiency.

Another undesirable feature of ordinary heaters stems from the excessive degasification along with the volatilization of oil and water or other components caused by the contacting of the hot heater surface by the emulsion or other fluid being processed. The gaseous vapors thus generated naturally course upwardly through the body of fluid being heated and create considerable turbulence which is undesirable in itself besides the loss caused by the volatilization of components which otherwise could be retained and conserved.

The turbulence caused by bubbling and excessive localized heating stirs and agitates the body of fluid being heated, and destroys the quiescent state often sought to be maintained. This is particularly true in petroleum emulsion treaters wherein stratification of the separated components is usually essential to satisfactory operation. Turbulence delays such stratification and creates obvious impedances to proper treater functioning.

The uniform and moderate heat applied through the present method also reduces and substantially limits thermal convection currents within the vessel to the unavoidable minimum which depends, of course, on the degree of heat necessarily required to be employed in each particular application. Such convection currents are often quite violent in themselves and impair to a considerable extent the desired settling and stratification often desired. Hence the ordinary direct-contact heater creates unwanted turbulence by both vaporization and excessively strong convection currents.

In addition to the delaying of stratification, such turbulence also often causes or increases the decomposition of unstable salts, such as bicarbonates, decomposition which otherwise would not occur. And, in general, the precipitation of various solids and other undesirable results ensue. Therefore, in many instances, all avoidable agitation and stirring of the fluid being heated is to be eliminated insofar as possible. The present heating method and structure accomplishes this by uniform, moderate, controlled heating.

The present invention overcomes substantially all of these difficulties by means of a heat-exchange medium which is relatively inert and serves to protect the fluid being heated against the application of excessive heat, while also protecting the hot walls of the heater from accelerated scaling and corrosion.

There are many reasons why it is desirable to have such a heater so constructed as to be insertable as a unit into the interior of the vessel to be heated. One reason is that a unitary structure is achieved which may be shipped and installed as substantially one main element and requires only one foundation or base. Another is that what would otherwise be heat losses from the heater are absorbed by the liquid in the vessel rather than being dissipated to the atmosphere. Still another is that materials are conserved because it is not necessary to provide a separate housing and separate insulation for the heater, along with connecting pipes and the like which are subject to leakage, heat dissipation, and corrosion.

It is therefore the principal object of this invention to provide an improved heating system which substantially eliminates the undesirable consequences of contacting the combustion chamber wall of a heater with a liquid which is corrosive, unstable, and/or has constituents which tend to decompose in the presence of excessive heat.

Another object of this invention is to provide an improved, internal vessel which is adapted to be positioned within the vessel containing the liquid to be heated, but which is readily available and/or removable for inspection, repair or replacement.

Another important object of the invention is to provide an improved system for heating a body of liquid within a vessel wherein a body of liquid heating media is enclosed within the body of liquid and heated whereby the body of liquid is indirectly heated through the body of heating media.

A further object of the invention is to provide an improved heater of the type described utilizing hot water or other suitable liquid heating mediums for conducting and transferring heat from the heater to any desired point or points in the vessel containing the liquid to be heated, whereby heater corrosion and hot fluid film problems are substantially eliminated.

Yet another object of the invention is to provide an improved, internal, vessel heater particularly adapted for use in vessels through which fluids to be heated are flowing, said heater providing increased heating area and circuitous paths which the fluids may follow for improved, controlled heating; and wherein means are provided for drawing off a liquid heat exchange medium from the heater and directing the former to any desired point in the vessel for additional or supplemental heating of the fluids.

A still further object of the invention is to provide an improved internal heater especially desirable for use in petroleum-containing vessels such as emulsion treaters, which furnishes ample heat for carrying out emulsion-breaking or other operations, but which does not subject the petroleum to temperatures in excess of the point at which decomposition and other undesirable results, such as turbulence, become of consequential magnitude.

Another object of the invention is to provide an improved internal, vessel heater for use in emulsion treaters from which the separated water is to be conducted through a filter and/or to a disposal well, wherein the emulsion being treated is heated in accordance with the requirements of that particular emulsion, and is not heated at any point above the critical temperature or temperatures at which precipitation becomes substantial so as to tend to clog the pores of the filter and/or the disposal well.

Another object of the invention is to provide an improved internal, vessel heater having a heater drum and a liquid heating medium drum insertable as a unit into an emulsion treater or other vessel through which fluid passes to be heated or to be heated and otherwise processed; and wherein means are provided for preheating the incoming fluid before the latter enters into the principal heating zone or area.

A still further object of the invention is to provide an improved heater for emulsion treaters having a main heating element and an auxiliary coil connected to the heater for drawing off a liquid heat exchange medium therefrom, said coil being positioned so that the incoming fluid flows thereover and therethrough and is preheated before contacting the main heating element.

In this application and the claims appended thereto a number of defined terms will be used for the sake of simplicity.

The terms "heat-unstable liquid" and "heat-unstable fluid" will be used to designate any liquid or fluid which tends to deposit scale or cake on an excessively heated surface, to display corrosive properties, to decompose in the presence of heat, to lose components by vaporization in the presence of heat, or from which solids may precipitate in the presence of heat, or which may undergo other undesirable changes in the presence of elevated temperatures such as petroleum, petroleum emulsions, salt-bearing liquids such as water, and like fluids.

The terms "heat-stable liquid" and "heat stable fluid" will be used to designate liquids or fluids which do not deposit scale or become corrosive within reasonable temperature limits and which exhibit a substantial minimum of undesirable or harmful properties when in contact with a hot surface, such as hot metal, within the range of ordinary flame temperatures, examples being fresh water, ethylene glycol, commercial heat-transfer fluids, and the like.

A construction designed to carry out the invention will be hereinafter described together with other features of the invention.

Figure 2:
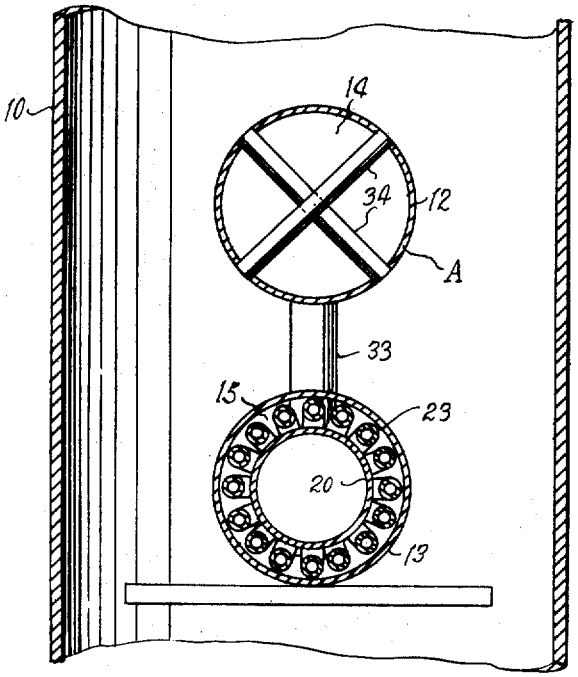
Figure 3:
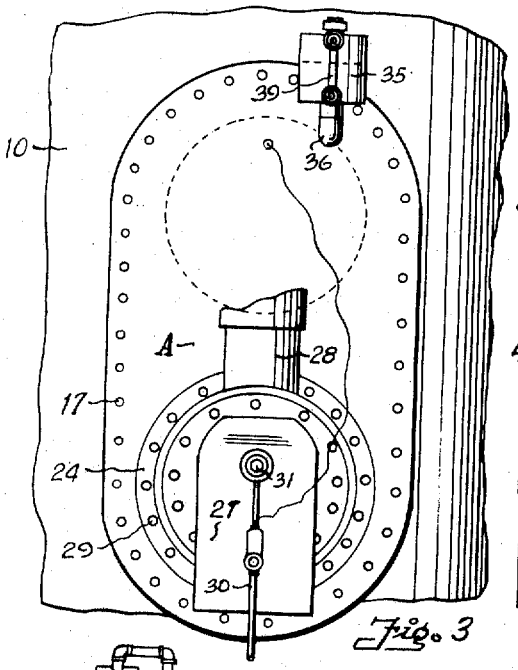
Figure 4:
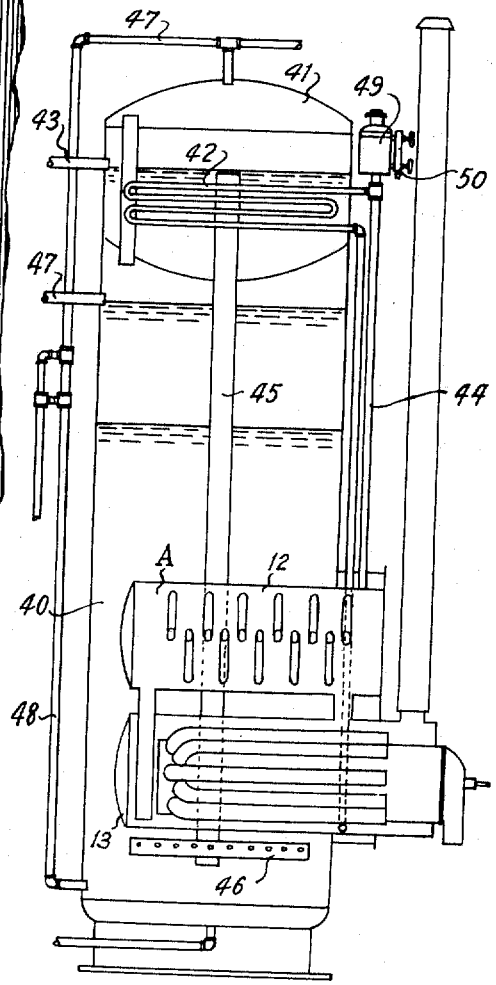
Figure 5:
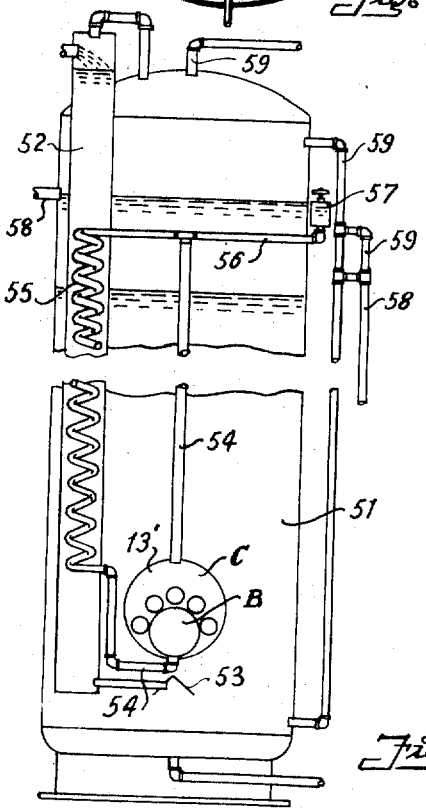
Figure 6:
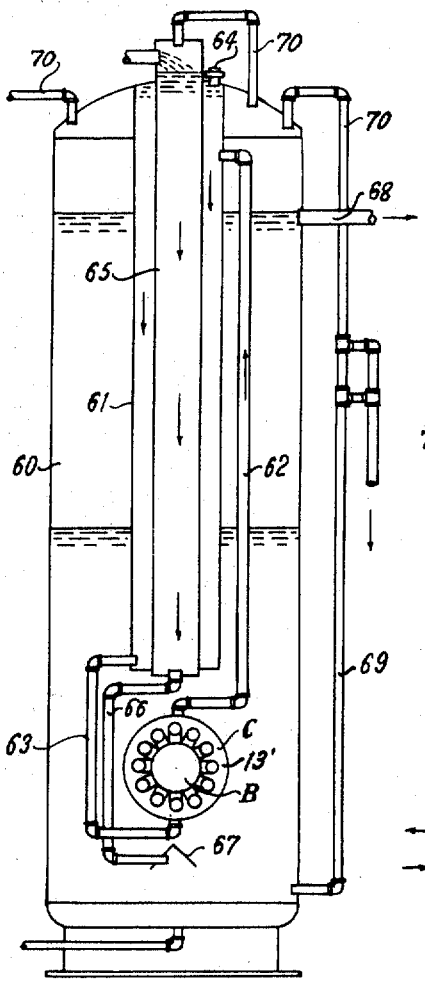
Figure 7:
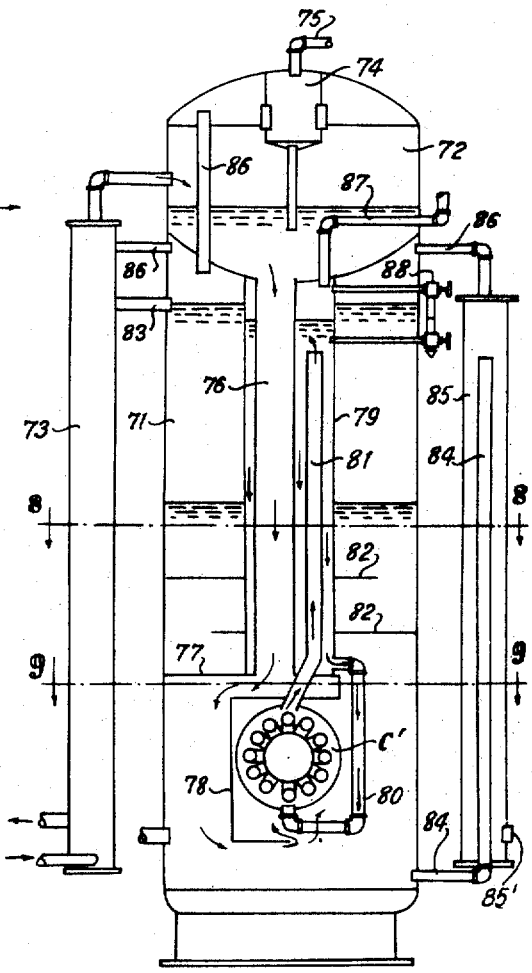
Figure 8:
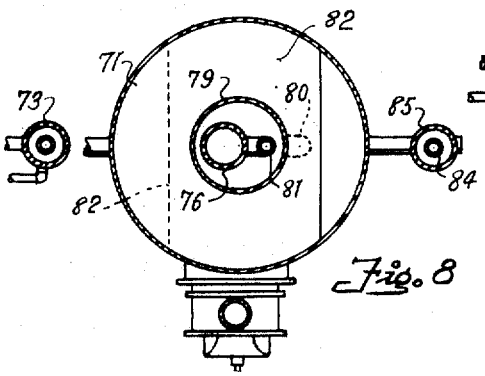
Figure 9:
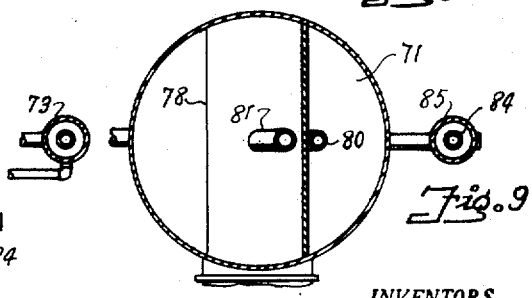

The invention will be more readily understood from a reading of the following specification and by reference to the accompanying drawings, wherein examples of the invention are shown, and wherein:

Fig. 1 is a vertical, longitudinal, sectional view of a heater constructed in accordance with this invention, Fig. 2 is a vertical, transverse, sectional view taken on the line 2—2 of Fig. 1, Fig. 3 is an elevation of the burner end of the heater, Fig. 4 is a vertical, sectional view of an emulsion treater showing one adaptation of the heater, Fig. 5 is a vertical, sectional view, partly broken away, of an emulsion treater showing an adaptation of a modified heater, Fig. 6 is a vertical, sectional view of an emulsion treater showing another adaptation of the modified heater, Fig. 7 is a vertical, sectional view of an emulsion treater showing another adaptation of the modified heater, Fig. 8 is a horizontal, cross-sectional view taken on the line 8—8 of Fig. 7, and Fig. 9 is a horizontal, cross-sectional view taken on the line 9—9 of Fig. 7.

In the drawings, the numeral 10 designates a vessel or container through which flows or in which is disposed a heat-unstable liquid to be heated. This invention does not contemplate primarily the heating of liquids within the vessel to temperatures in excess of 200°–300° F. However, higher, and especially lower, temperatures may be obtained and employed in accordance with the heating problem at hand. Therefore, specific reference to operating temperatures has not been made.

Nor is the invention to be limited to specific heat exchange liquids (although fresh water is chiefly used) or to certain liquids to be heated. This method of and means for heating is particularly adaptable to the petroleum industry wherein is processed and handled a raw product, fluid in nature, and of a widely variable composition; a product which is often corrosive and is relatively unstable. Obviously, this invention is of great benefit under such circumstances. Nevertheless, there are many other applications readily apparent, possibly of equal importance and certainly of equal benefit and success.

For the purposes of illustration, the invention will be described largely with reference to use in petroleum emulsion treaters. And, to avoid unnecessary repetition the various other uses of the invention will not be pointed out at each pertinent phase or point of the description. However, it is to be kept in mind throughout that reference to emulsion treaters is illustrative only.

Proceeding now with the description of a specific embodiment which incorporates the novel features and principles of this invention and illustrates this new method of heating, the vessel 10 receives a heat generator or unit A through a flanged opening 11 in one side wall of the vessel. The heating unit has a casing which includes an upper or heated-liquid chamber or drum 12 and a lower or heating chamber or drum 13, both drums being in the shape of elongate cylinders having their inner ends closed by suitable dished plates 14 and 15, respectively. The drums are disposed horizontally within the vessel and have their longitudinal axes alined parallel to one another in a vertical plane. The outer end of the upper cylinder is closed by being welded to the upper portion of a vertical plate 16 of such size and shape as to cover the flanged opening 11, said plate being secured to the flange by suitable bolts 17. The plate 16, thus affixed in position closing the opening 11, supports the upper drum 12 in a proper horizontal position with the vessel 10.

The lower drum 13 has its outer section 18 extending through the lower portion of the plate 16 and projecting outwardly therebeyond. The drum is welded, or otherwise suitably secured, to the plate so as to be supported thereby. Thus, since both the upper and lower drums are carried by the plate 16 and constitute the major portion of the heating unit, the latter may be readily removed for servicing or inspection by simple removal of the plate.

An annular, external flange 19 is provided on the extreme outer end of the outer section 18 of the lower drum for securing a firing unit B. The firing unit comprises an elongate heat generating or combustion chamber or tube 20 having a suitable burner structure or other heat supplying means 21 secured to its outer, open end and its opposite end closed. A plurality of tubular elbows 22 are connected into the combustion tube near its closed end and communicate with the interior thereof. The elbows are arranged in spaced and staggered relation in two circumferential rows encircling the combustion tube, and project radially therefrom with their outer ends directed toward the burner end of the tube. A suitable elongate fire tube or conduit 23 is welded or otherwise secured to the outer end of each of the elbows 22, said tubes extending in parallel relation to and adjacent the combustion tube 20. Thus, flame and combustion gases may travel from the burner structure 21, through the combustion tube 20 and the elbows 22 into the fire tubes 23, and therethrough to a point adjacent the burner end of said combustion tube. The fire tubes, therefore, may be described as return fire tubes.

The combustion tube carries a relatively wide external, annular flange 24 at a point spaced a short distance from the burner structure. The flange is substantially equal in diameter to the flange 19 carried by the lower drum 13 although the combustion tube is less in diameter than said drum. A plurality of spaced, radially-offset openings 25 are provided in a concentric circle in the flange 24, and receive the outer ends of the fire tubes 23. The joints between the fire tubes and the flange, as well as the joints between the fire tubes, the elbows, and the combustion tube, are made fluid tight by welding or other suitable means. That portion of the firing unit from the flange 24 inwardly, is thus flame and fluid tight.

A cylindrical smoke box 26 having one end open, encircles the outer portion of the combustion tube and has its open end abutting and joined to the flange 24. The diameter of the smoke box is such as to place the open outer ends of the fire tubes there within whereby the combustion gases are conducted into the interior of the box. The combustion tube extends through the outer end wall of the box and projects therebeyond, the burner structure 21 being connected into the projecting portion of the tube exteriorly of said box. A suitable smoke stack or flue 27 conducts combustion gases upwardly from a nipple 28 communicating with the smoke box, and may be of any desirable style or structure. The stack terminates, ordinarily, slightly above the upper end of the vessel 10 and may carry a down-draft preventor (not shown).

The entire firing unit B is insertable as a one-piece structure (normally without the flue 27) into the lower or fluid drum 13. The flange 24 abuts the flange 19 and is secured thereto by bolts 29, thus rigidly supporting and maintaining the firing unit in its proper position. The combustion tube 20 is of such length as to terminate short of the inner end wall 15 of the lower drum thereby affording a small space adjacent said end wall, and the overall diameter of this tube along with the surrounding fire tubes 23 is less than the internal diameter of the lower drum so that an annular heating space is provided between the firing unit and the inside walls of the drum. The firing unit is thus removable and replaceable as an integral element for servicing or inspection, and the maintenance of the entire heating unit A in proper operating condition is facilitated and considerably simplified.

The burner structure 21 receives suitable fuel or fuel and air connections 20 for supplying any desirable combustible substance to the former. Usually, of course, fuel oil or gas will be utilized, and especially the latter in installations in the petroleum industry. However, this invention also contemplates the use of other means of heating such as electricity or high temperature heat exchange fluids of an organic nature. Suitable control means such as a valve 31 or automatic, temperature-controlled devices (shown in later-described illustrations) may be employed to control and regulate the heat output of the firing unit, or to maintain a certain portion or portions of the vessel 10 at set temperatures. In the latter case, suitable temperature-responsive elements may be positioned in the vessel at suitable points and operatively connected to the burner control means.

A liquid conductor in the form of a nipple 32 extends vertically from the upper wall of the lower drum 12, through the bottom of the upper drum and to a point near the upper wall of the latter, the nipple being connected into the top and bottom walls of the drums by welding or other suitable means. The conductor 32 is positioned near the outer ends of the drums while a similar conductor 33 depends from the lower wall of the upper drum near its inner, closed end 14. The conductor 33 extends downwardly through the upper wall of the lower drum into the space between the inner end of the combustion tube and the end wall 15 of said lower drum. This latter conductor terminates a short distance above the bottom wall of the lower drum so as to direct heating liquid adjacent the lower side of the firing unit B, as will be more fully described hereinafter.

All the connections and joints between the conductors 32 and 33 and the upper and lower drums are fluid-tight so that the drums are interconnected in sealed relation with their interior portions in substantially direct communication. The conductors also supplement the plate 16 in linking the drums together structurally into an integral rigid element forming a portion of the aforesaid heating unit A. This unit is readily removable when so desired, by disconnection of the bolts 17, whereby the entire unit may easily be serviced, repaired or replaced with a minimum of difficulty and labor, and whereby proper inspection is facilitated and encouraged due to the ease of such inspection. Obviously, replacement of either the entire heating unit A or the firing unit B is greatly simplified, the latter especially so since draining of the vessel 10 is not required for such replacement.

However, the need for replacement of either unit is seldom encountered by reason of the other desirable features of this invention.

The upper drum 12 carries a plurality of transverse conductors 34 extending thereacross for increasing the heat exchange area. The conductors are disposed at substantially 45° angles and communicate with opposite exterior sides of the drum so that the fluid within the tank may pass therethrough and be heated by the contents of the drum. The connections between the ends of the conductors and the drum wall are fluid tight whereby no commingling of the tank contents and the heating medium can take place. Increased heating area and increased thermosyphon paths are provided by this structure.

The conductors 34 may be arranged in any desired fashion. However, a particularly suitable structure has been found to comprise two rows of conductors disposed at right angles in alternate relation, with each row being positioned at substantially a 45° angle with respect to the horizontal. Fluids are thus heated in passing upwardly through the conductors, and a plurality of heating channels or circuits is afforded.

A small upright cylinder 35 is carried upon an elbow 36 and nipple 37 extending from the upper portion of the drum 13 through the plate 16. A filling connection 38 is provided in the upper end of the cylinder while a liquid level gauge glass 39 is connected into the side wall of the latter.

A suitable heating or heat transfer liquid is contained within the drums 12 and 13. This heat-stable liquid or medium may be fresh water, ethylene glycol, a high boiling point organic liquid, or any other heat exchange liquid having the desired physical and chemical characteristics. Chemical inertness or non-corrosiveness, high specific heat, and good heat conduction are, of course, especially to be sought in such a fluid. Although fresh water is widely used, the invention is not to be limited to such use, as any of the well-known liquids or mediums may be and are used in accordance with the requirements of the specific conditions at hand.

The heating medium, fresh water as an example, is disposed within the upper and lower drums and carried at a level within the cylinder 35 so as to be visible in the gauge glass 39. Any desired level may be employed, so long as the usual requirement of covering the fire tubes 23 is observed. However, in this type of heater, a level within the cylinder 35 has been found desirable. The plates 16 and the flange 24 retain the liquid within the drums as well as seal the latter against moderate hydrostatic pressure. The filling connection 38 permits addition of heat exchange liquid to the unit. Safety connections such as pressure vents, temperature controls, and the like, may be connected into the unit at any desired points. A drain tube 39' extends from the lower wall of the lower drum for removal of the heating liquid.

The structure described, while simple in operation, possesses many advantages and features not heretofore supplied by previous heaters. The combustion tube and the fire tubes, being surrounded by a blanket of non-corrosive heating liquid, are protected against scaling, along with decomposition and accelerated rusting and other undesirable or harmful conditions. In addition, since the tubes are immersed in a liquid selected for its efficacy as a heat exchange medium, the former may operate more efficiently due to the improved heat transfer conditions inherently contributed by such a liquid. "Hot spots" are reduced in size and intensity, and a general overall reduction of scaling and the like, and of high "film" or heat transfer resistance, along with an increase of heating rate and efficiency results. At the same time, turbulence and vaporization are minimized because of the uniform moderate heating achieved.

The heating liquid, having increased heat content due to its contact with the fire and combustion tubes, rises through the conductor 32 by reason of its reduced density and enters into the upper portion of the upper drum 12. As the heat content of the heating medium is dissipated through the walls of the upper drum, cooling occurs whereby the density of the medium or liquid is increased and it seeks the level of the lower drum by passing downwardly through the conductor 33 to the lower portion of the lower drum 13 wherein it is again heated by the firing unit. Thus, a continuous heating and cooling of the liquid occurs, setting up a thermal convection circuit or circulation of the heated liquid into the upper drum and a return of the less-heated liquid into the lower drum.

Of course, both drums are relatively hot and within the same temperature range so that there is a constant transfer of heat to the contents of the vessel 10 from both drums. The overall quantitative transfer of heat approaches the input of the burner unit since the heat radiation from the heating unit, which is normally lost by dissipation to the atmosphere from the unit and the pipes connecting it to the vessel, is instead absorbed by the contents of the vessel. The units of heat which escape through the stack represent a relatively small percentage due to the low specific heats of the combustion gases and the efficient heat transfer afforded by the fire tube structure.

As pointed out before, the nature of the heating medium protects the firing unit as well as enhancing its thermal efficiency. The utilization of this liquid as an intermediate conductor of heat also protects the liquid contained within the vessel 10 and provides a more desirable and uniform mode of introducing heat into said vessel. Since the hottest portion of the heating medium will not be at a temperature greatly in excess of the temperature of the coolest portion of said medium, the entire exterior walls of the unit will be kept at a substantially uniform temperature with no "hot spots" or locally-increased rates of heat transfer. Therefore, the objectionable features of ordinary heaters set out hereinbefore are substantially eliminated. Localized "coking" or scaling on the outside of the heater, and decomposition, along with excessive volatilization, of the vessel contents is rendered negligible if not prevented entirely.

It will readily be seen that this heater is particularly adaptable to emulsion treaters of the type wherein the emulsified fluid flows through a vessel in which it is heated to facilitate breaking of the emulsion and its separation into its normally immiscible phases, along with the actions of reduction of excessive gaseous content and stabilization of the fluids produced. Such emulsion is preferably introduced below the heating unit A and allowed to flow upwardly, by reason of its density or gravity, through the body of salt water normally present in such treaters. In passing over and around the drums 12 and 13, the emulsion is heated to the point at which it readily stratifies, under the influence of the conditions present, into its plurality of immiscible components, the latter seeking their own level by reason of their differences in gravity. Thus, oil, relatively water-free, rises to the upper portion of the vessel and the water (usually salt water) settles or remains in the lower portion of the vessel. Suitable and usual connections (later described) maintain the oil and water phases at the proper levels by removing these components separately in accordance with the quantities thereof introduced in the influent emulsion.

Of course, the entire contents of the vessel will be heated or warmed because of the immersion of the heating unit therein, and especially the body of salt water which is in immediate proximity to the heating unit. Obviously, a portion, which may be considerable, of the heating of the incoming emulsion is carried out or effected by this body of heated fluid through which the emulsion passes, so that a situation obtains wherein the emulsion is constantly drawing heat from said body of fluid and by the direct contact, from the heater unit, while the firing unit B, through the convection circulation of the heating liquid within the heating unit, is constantly supplying heat to the emulsion and restoring or maintaining the heat content of the heated body of liquid external of said heating unit. And this exchange and distribution of heat is carried out without permitting any of the vessel contents to come in contact with an excessively heated surface or allowing the relatively hot combustion and fire tubes of the firing unit to be subjected to the action of other than relatively inert, noncorrosive fluids.

The desirable and advantageous results are manifest. The many contributory and componental benefits cumulate in two main and important benefits, namely, a greatly increased life and maintenance of operating efficiency for the heating unit, and freedom from deleterious effects upon the liquid being heated within the vessel 10.

In Figs. 4 through 9 of the drawings, are shown various applications of this heating method and structure to petroleum emulsion treaters.

The application illustrated in Fig. 4 includes the usual upright tank 40 having the heating unit A carried in the lower position thereof. A preliminary separation chamber 41, which may be of any suitable type or structure, is disposed in the upper end or portion of the tank and is provided with any desirable type of pipe coil 42. An inlet pipe 43 conducts the emulsion stream directly into the separation chamber 41 wherein an initial separation of gas and partial stratification of the emulsion components occurs. The heating coil 42 is connected through riser pipes 44 with the upper side of the upper drum 12 and the lower portion of the lower drum 13 so that a thermal siphon circuit is established from the heating unit A through the coil 42 and effective heating of the emulsion in the preliminary separation chamber 41 is established by means of the thermo-siphon or thermal convection circuit from the heating unit through the coil 42. The emulsion is thereby heated prior to its introduction into the main treating chamber of the tank so that more efficient emulsion breaking or treating may be obtained.

A vertical conductor 45 extends from the interior of the chamber 41 into a point below the heating unit A within the lower portion of the tank 40, and carries a suitable spreading unit 46 positioned immediately below said heating unit. Suitable connections 47 are provided for withdrawing clean oil and water from the tank 40 and for permitting equalization of gas pressures between the various portions and elements of the tank as well as withdrawal of said gas to a suitable place of disposal.

In the operation of said treater, the emulsion entering through the tank 40 undergoes a preliminary separation step in the upper chamber 41 wherein at least a portion of the gases carried by said emulsion are separated and removed, and wherein preheating of the emulsion is effected by means of the coil 42. Thus, the emulsion stream passes downwardly through the conductor 45 in a partially heated or warmed condition so that the load placed on the lower portion of the treater is somewhat reduced. Thus, the preliminary partial separation of the emulsion into its constituent components along with the coalescing of "free" water and the removal of excessive gas is greatly enhanced within the upper chamber 41, and a large proportion of such separation occurs prior to the introduction of the emulsion stream into the lower portion of the tank. Utilizing this preheating step, separation and stratification of large portions of the emulsion takes place almost immediately upon its entry to the lower part of the tank. The heat available from the body of salt water and the heating unit A within said lower portion is thus utilized to a large extent to heat and break the "tighter" portions of the emulsion since the heating unit is not encumbered and hampered by the presence of large quantities of "loose" emulsion. The latter, having already been separated to a considerable degree, enters as relatively distinct oil and water phases which pass rapidly to their respective levels in the lower portion of the tank. This rapid flow is engendered by the comparatively sharp difference in the gravities of the oil and water. The as yet unbroken emulsion has a more intermediate gravity, usually nearer that of water than that of oil, and therefore tends to pass upwardly over the drums 12 and 13 at a relatively slow rate whereby its heating and subsequent breaking or separation, is greatly facilitated. As it separates, its components, of course, move more rapidly toward their proper levels. In this manner, the output of the heating unit is directed toward more efficient and certain results and the overall efficiency and efficacy is enhanced.

The emulsion, after preliminary separation in the chamber 41, passes downwardly through the conductor 45 to the spreader 46 positioned beneath the heating unit A. Because of its gravity, the emulsion flows upwardly through the body of heated water present in the lower portion of the tank, around the drums 12 and 13, and is properly heated for breaking and separation. Following such separation or stratification, the clean oil from the emulsion rises to the medial portion of the tank while the water, usually salt water, settles to the lower portion of the tank. The oil is taken off near the upper end of the lower portion of the tank by means of the connections 47, while the water is also drawn off through a water leg 48 suitably associated with said connection 47. The structure of the water leg is such as to maintain the desired water level within the tank and acts through the well-known principles of siphons, to remove water only as it is introduced by the influent emulsion. The body of heated water within the tank is thus kept at a substantially uniform level at all times.

A suitable filling drum or cylinder 49 is connected into the upper end of one of the risers 44 and carries a water level glass or gauge 50 for indicating the level of the heat exchange liquid within the heating unit system as represented by the heating unit A and the coil 42. The level of such heat exchange liquid is preferably maintained within the height of the cylinder 49 so as to be visible within the gauge glass 50.

The second application of the heating unit is illustrated in Fig. 5 of the drawings. This emulsion treater includes a tank 51 into which the emulsion stream enters through a vertical flume 52 extending from the upper end of the tank to a spreader 53 positioned in the lower portion of the tank. A modified form of heating unit C is provided in the lower portion of the tank immediately above the spreader 53. In this form of heating unit the upper drum 12 is eliminated and the heating unit B is disposed within the lower portion of the lower drum 13′, with additional space within the drum above said bearing unit being thereby provided. A pair of risers 54 extend from the upper and lower sides of the drum 13′ and are connected into an elongate, helical heating coil 55 positioned within the vertical flume 52. A branch pipe 56 extends from the upper portion of the latter heating system through the wall of the tank 51 and carries upon its outer end a suitable filling cylinder 58, similar to the cylinder 49 shown in Fig. 4 of the drawings. The risers 54 establish a thermo siphon circuit through the coil 55 so that the heat exchange liquid contained within the heating unit C and the coil 55 is caused by convection to flow through the coil. In this manner, emulsion entering the upper portion of the flume 52 is thoroughly preheated as it passes downwardly through said flume to the spreader 53 and enters the main portion of the tank 51 in the heated and partially separated condition referred to in connection with the description of the application shown in Fig. 4 of the drawings. In this manner, the load placed upon the heating unit C as represented by the drum 13′ is somewhat diminished, and the heating taking place at such drum is directed primarily to separation of the tighter portions of the emulsion streams which were not caused to separate by the preheating steps.

Following separation of the emulsion stream, the components stratify within the tank 51, the oil and water being taken off through suitable connections 58 in a manner similar to that previously described. Equalizing gas connections 59 withdraw separated gases from the treater and provide for pressure equalization between the various chambers thereof.

This modified heater unit C may, of course, be utilized with various other types or structures of emulsion treaters. Its primary use is in instances wherein less heating is required, but it may be used substantially interchangeably with the heater unit A, previously described, and achieve the same beneficial results.

Another particular application of the heating unit C is shown in Fig. 6 of the drawings. In this application, the usual upright tank 60 carries the heating unit C in its lower portion and is provided with a pair of concentric, axial conductors extending from its upper end downwardly through the tank 60 to a point immediately above said heating unit. The upper end of the outer conductor 61 is closed by the upper end of the tank 60 while the lower end of said conductor may be closed in any suitable fashion. A riser pipe 62 extends from the upper side of the unit C to the upper portion of the conductor 61, and a second riser pipe 63 extends from the lower portion of said conductor to the lower side of the heating unit. A suitable filling connection 64 connects into the upper portion of the conductor 61 so that said conductor and the unit C may be filled with heat exchange liquid therethrough. The risers 62 and 63 establish a thermo-siphon circuit through the conductor so that hot heat exchange liquid is caused to flow through said conductor in a continuous manner as such heat is introduced by means of the firing of the unit B.

The emulsion stream enters the upper portion of the inner conductor 65 and flows downwardly therethrough to a pipe 66 connected to the lower end of said inner conductor, the pipe 66 extending downwardly to a suitable spreader 67 positioned below the unit C. Thus, the incoming emulsion stream is thoroughly preheated in its downward passage through the conductor 65 by means of the heat exchange liquid present within the conductor 61 surrounding the conductor 65, and the emulsion thus reaches the spreader 67 in a warmed and partially separated condition. Again, the heating load placed upon the main portion of the treater tank is considerably diminished by this preheating step since considerable portions of the emulsion will be broken by the moderate temperatures created within the inlet conductor 65 and need not be heated to relatively high temperatures before properly separating and stratifying within the tank 60. The hottest portion of the heating system, mainly the drum 13′ of heating unit C, is thereby employed for heating of the more difficult portions of the emulsion with excessive and unnecessary heating of the looser portions of the emulsion being substantially eliminated.

After proper heating, the emulsion separates and stratifies into an oil layer and a water layer. The oil being drawn off through an outlet pipe 68 while the water is withdrawn through a suitable water leg 69 the usual gas equalizing and removing connections 70 are also provided.

A somewhat more detailed emulsion treater is shown in Fig. 7 of the drawings. This treater being adapted for the handling of tighter emulsions or emulsion more difficult to separate or break. This form includes an upright tank 71 having a preliminary separation chamber 72 at its upper end. The emulsion stream enters the lower end of a vertical, external, heat exchanger 73 and passes upwardly therethrough to enter into the preliminary separation chamber 72. Warm oil leaving the tank 71 passes through the heat exchanger 73 in the opposite direction so that the incoming emulsion stream is partially preheated thereby. Upon entering the chamber 72, a considerable portion of the gas carried by the emulsion stream will be released and may pass into a small gas scrubbing chamber 74 which may be of any suitable type or construction, said chamber being positioned in the upper portion of the chamber 72 and carrying a gas outlet line 75.

From the chamber 72, the emulsion stream passes downwardly through a vertical flume 76 extending between the bottom of the chamber 72 and a horizontal partition 77 provided in the lower portion of the tank 71. A heating unit C′ is positioned in the lower end of the tank 71 beneath the partition 77, said unit being partially enclosed by a box 78 so that the downwardly flowing emulsion stream will pass around said box and over the edge of the bottom wall thereof before it can pass upwardly around the heating unit and into the body or main portion of the tank. The flume 76 is surrounded by a jacket 79 connected at its lower end by a pipe 80 to the lower portion of the heating unit C′ and receiving a riser pipe 81 extending upwardly from the upper side of said heating unit. With this structure, hot heat exchange fluid flows upwardly from the unit C′ and through the riser 81 into the upper portion of the jacket 79 and then passes downwardly through said jacket and the pipe 80 to the lower portion of the heating unit, such circulation occurring as the heat exchange liquid cools within said jacket. Thus, the flume 76 is surrounded by a body of hot heat exchange liquid so that additional preheating of the emulsion stream occurs before the introduction of the latter into the main portion of the tank 71. In this manner, a considerable portion of the emulsion stream is sufficiently heated to cause its separation prior to its subjection to the heating influent of the heating unit C′. The plate 77 extends across a major portion of the cross section of the tank 71 so that the upwardly flowing emulsion stream is directed to one side of the tank so as to pass upwardly around the inner edge of said plate. A plurality of transverse, horizontal baffles are positioned in staggered relation above the plate 77 so that the emulsion stream is caused to follow a circuitous and elongated path thereby increasing its opportunity to separate and stratify upon reaching the upper portion of the tank 71. In such upper portion, the clean oil rises to the upper part of the tank while the separated water settles to the lower part, the clean oil being drawn off through a pipe 83, downwardly through the preheater 73, and to a suitable place of storage. As before pointed out, the clean oil, being relatively warm when it enters the preheater 73, serves to partially preheat the incoming emulsion stream.

The water separated is drawn off through a pipe 84 from the lower portion of the tank 71, the pipe 84 extending upwardly through a casing 85 positioned exteriorly of the tank 71 and forming a well to maintain a predetermined water level within the said tank 71. The pipe 84 and tube 85 thus act in the same fashion as a water leg so that, although the water is withdrawn from the bottom portion of the treater tank, a predetermined water level is maintained within the tank at a height considerably above the bottom portion thereof. The water is withdrawn from the bottom of the casing 85 through the outlet 85'.

Suitable equalizing gas connections 86 are provided for maintaining the various compartments of the treater in substantial pressural equilibrium, and a filling connection 87 is connected into the upper end of the jacket 79 for the addition of heat exchange liquid thereto. This liquid is normally carried at a level near the upper end of the jacket and a suitable liquid level gauge 88 is connected to a jacket for indicating such level.

In all of the applications described, suitable control valves may be connected into the various riser pipes for regulating the degree of preheating of the emulsion stream accomplished prior to the introduction of such stream into the treater tank proper. Such valves may be controlled in any desired fashion, an ordinary thermostatic control having been found entirely suitable for such purpose. Any desired degree of such heating control may be effected, and in addition, the thermostatic or other control operating means may be positioned at any desired point within the tank or any of the vessels or compartments thereof. In all of the described modifications and applications, the various conductors and flumes, such as the flume 76 and the conductor 45, also act as heat exchangers since they extend through the bodies of heated fluid within the tank. In this manner, not only are the contents of each conductor additionally heated, but loss of this additional heat therefrom is prevented.

This latter feature serves further to increase the overall thermal efficiency of these treaters, and the cumulative effect of all the various desirable characteristics hereinbefore set out is to provide a treater having a high emulsion treating capacity in comparison to its size and fuel requirements. An important end-result is contributed to by all the advantages and features incorporated into the heater unit as well as the treater structure, and is a direct result of this improved heating method. Indeed, throughout the various examples the efficiency and increased working life obtained, along with nonimpairment of the liquid being processed, stems directly from this new method and structure for heating.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. An apparatus for a system of treating oil field emulsion streams which includes, a multi-compartment container adapted to contain a body of heated water in one compartment, means for maintaining said body at a predetermined liquid level, a conductor discharging the emulsion stream into said body, a hot fluid generator disposed in the compartment adapted to receive a body of heated water below the predetermined liquid level, the generator being adapted to be immersed in said body for heating said body and emulsion stream to break down the emulsion, a heating conductor in heat exchange relationship with another compartment of the vessel, said latter conductor being connected to the hot fluid generator for circulation of the hot fluid through said heating conductor, means for conducting the emulsion stream through the latter compartment for preheating prior to its discharge into the body of water, means for carrying off the water precipitated from the stream, and means for carrying off the clean oil.

2. For treating oil field emulsion streams, the combination with a multi-compartment vessel having one compartment adapted to contain a body of heated water, an emulsion stream inlet conductor, a conductor discharging the stream into said body of water, means for carrying off the water precipitated from the stream while maintaining a predetermined water level in the vessel, and means for carrying off the clean oil from the body of water, of an internal heater for the vessel including, a heater casing having upper and lower chambers disposed within the vessel below the water level therein so as to be immersed in the water contained therein, connections between the chambers for thermo-siphonic flow, a substantially non-corrosive heat exchange liquid contained within the heater casing, a firing unit immersed in the heat exchange liquid in the lower chamber, a preheater conductor in heat exchange relationship with another compartment of the vessel, said preheater conductor being connected into the heater casing for circulation of the heat exchange liquid through said preheater conductor, means for conducting the emulsion stream through the latter compartment for preheating prior to its discharge into the body of water, and means for burning a fuel within the firing unit to heat the latter and cause the heat exchange liquid to be heated and circulated whereby the body of water within the vessel and the emulsion stream are subjected to a substantially uniform heating action.

3. For treating oil field emulsion streams, the combination with a multi-compartment vessel having one compartment adapted to contain a body of heated water, an emulsion stream inlet conductor, a second conductor communicating with the inlet conductor and discharging the stream into said body of water, means for carrying off the water precipitated from the stream while maintaining a water level in the vessel, and means for carrying off the clean oil from the body of water while maintaining an oil level in the vessel, of an internal heater for the vesel including, a heater casing disposed within the vessel below the water level so as to be adapted to be immersed within the water contained therein, a substantially non-corrosive heat exchange liquid contained within the heater casing, a firing unit immersed in the heat exchange liquid in the casing, a preheater jacket surrounding the emulsion stream discharge conductor, said jacket being connected into the heater casing, means for conducting the heat exchange liquid through the jacket for preheating the emulsion stream prior to its discharge into the body of water, and means for burning a fuel within the firing unit to heat the latter and cause the heat exchange liquid to be heated and circulated whereby the body of water within the vessel and the emulsion stream are subjected to a substantially uniform heating action.

4. For treating oil field emulsion streams, the combination with a vessel adapted to contain a body of heated water, an emulsion stream inlet conductor, a second conductor communicating with the emulsion stream inlet conductor and discharging the stream into said body of water, means for carrying off the water precipitated from the stream while maintaining a water level in the vessel, and means for carrying off the clean oil from the body of water, of an internal heater for the vessel including, a heater casing disposed within the vessel below the water level so as to be adapted to be immersed in the body of water contained therein, a substantially non-corrosive heat exchange liquid contained within the heater casing, a firing unit immersed in the heat exchange liquid in the casing, a preheater jacket surrounding the second-named conductor, said jacket being connected into the heater casing for preheating the emulsion stream prior to its discharge into the heated body of water, and means for burning a fuel within the firing unit to heat the latter and cause the heat exchange liquid to be heated and circulated whereby the jacket and the body of water within the vessel and the emulsion stream are subjected to a substantially uniform heating action.

5. The combination as set forth in claim 4, an auxiliary preheater for heating the influent emulsion stream by means of the discharged clean oil, and baffles in the vessel above the heater casing for causing the emulsion stream to follow an elongate path within said vessel.

6. An apparatus for a system of treating oil field emulsion streams which includes, a multi-compartment container adapted to contain a body of heated water in one compartment, means for maintaining a predetermined water level in said compartment, a conductor discharging the emulsion stream into said body, a hot fluid generator in said compartment below the water level so as to be adapted to be immersed in said body for heating said body and emulsion stream for breaking down said emulsion into its components, a heating conductor in heat exchange relationship with another compartment of the vessel, said heating conductor being connected to the hot fluid generator for thermo-siphonic flow and having at least a portion above the hot fluid generator, means for conducting the emulsion stream through the latter compartment for preheating prior to its discharge through the body of water, means for carrying off the water precipitated from the emulsion stream, and means for carrying off the clean oil.

7. An apparatus for a system of treating oil field emulsion streams as set forth in claim 6, wherein the hot fluid generator includes, a heater casing, a firing unit within the casing, a heat exchange fluid filling substantially the entire interior of that portion of the casing disposed within the vessel, and means for burning a fuel within the firing unit to heat the latter and cause the heat exchange fluid to be heated and circulated whereby the heating conductor and the body of water within the vessel and the emulsion stream are subjected to a substantially uniform heating action.

8. An apparatus for a system of treating oil field emulsion streams which includes, a multi-compartment container adapted to contain a body of heated water in one compartment, a conductor discharging the emulsion stream into said body, means for maintaining a water level in said compartment, a hot liquid generator in the compartment below the water level so as to be adapted to be immersed in said body for heating said body and emulsion stream for breaking down said emulsion into its components, an elongate heat exchange conductor in close thermal juxtaposition with another compartment of the vessel so as to establish a heat exchange relationship between the heat exchange conductor and said latter compartment, connections between the hot liquid generator and the heat exchange conductor for thermosiphonic flow, means for conducting the emulsion stream through the second-named compartment for preheating prior to its discharge into the body of water, means for carrying off the water precipitated from the emulsion stream, and means for carrying off the clean oil.

9. An apparatus for a system of treating oil field emulsion streams as set forth in claim 8, wherein the hot liquid generator includes, a heater casing, a firing unit within the casing, a heat exchange liquid filling substantially the entire interior of that portion of the casing disposed within the vessel, and means for burning a fuel within the firing unit to heat the latter and cause the heat exchange liquid to be heated and circulated whereby the heat exchange conductor and the body of water within the vessel and the emulsion stream are subjected to a substantially uniform heating action.

10. For treating oil field emulsion streams, the combination with a vessel adapted to contain a body of heated water, an emulsion stream inlet conductor, a second conductor communicating with the inlet conductor and discharging the stream into said body of water, means for carrying off the water precipitated from the emulsion stream while maintaining a water level in the vessel, and means for carrying off the clean oil from the body of water, of an internal heater for the vessel including, a heater casing disposed within the vessel and having at least its major portion below the water level so as to be adapted to have at least its major portion immersed in the water contained therein, a heat exchange liquid contained within the heater casing, a firing unit having at least its major portion immersed in the heat exchange liquid in the casing for heating said heat exchange liquid, a heat exchange conductor within the vessel connected with the heater casing and defining a flow path through which the heat exchange liquid flows, fluid confining means within the vessel in thermal juxtaposition with the heat exchange conductor so as to establish a heat exchange relationship therewith, means for conducting the emulsion stream through the latter means prior to its discharge into the heated body of water, the firing unit generating heat within the internal heater to heat the latter and cause the heat exchange liquid to be heated and circulated whereby the heat exchange conductor and the body of water within the vessel and the emulsion stream are subjected to a substantially uniform heating action.

11. For treating oil field emulsion streams, the combination with a vessel adapted to contain a body of heated water, an emulsion stream inlet conductor, a second conductor communicating with the inlet conductor and discharging the stream into said body of water, means for carrying off the water precipitated from the emulsion stream while maintaining a water level in the vessel, and means for carrying off the clean oil from the body of water, of an internal heater for the vessel including, a heater casing disposed within the vessel and having at least its major portion below the water level whereby the heater casing is adapted to have at least its major portion immersed in the water contained therein, a heat exchange liquid contained within the heater casing, a firing unit having at least its major portion immersed in the heat exchange liquid in the casing for heating said heat exchange liquid, a coil within the vessel connected with the heater casing and defining a flow path through which the heat exchange liquid flows, fluid confining means within the vessel in thermal juxtaposition with the coil so as to establish a heat exchange relationship therewith, means for conducting the emulsion stream through the latter means prior to its discharge into the heated body of water, and means for generating heat within the firing unit to heat the latter and cause the heat exchange liquid to be heated and circulated whereby the coil and the body of water within the vessel and the emulsion stream are subjected to a substantially uniform heating action.

12. For treating oil field emulsion streams, the combination with a vessel adapted to contain a body of heated water, fluid confining means within the vessel, an emulsion stream inlet conductor connected to the fluid confining means, a second conductor in communication with the fluid confining means and discharging the stream into said body of water, means for carrying off the water precipitated from the emulsion stream while maintaining a water level in the vessel, and means for carrying off the clean oil from the body of water, of an internal heater for the vessel including, a heater casing disposed within the vessel and having at least its major portion below the water level whereby the heater casing is adapted to have at least its major portion immersed in the water contained therein, said heater casing being adapted to contain a heat exchange liquid, a firing unit in the heater casing and being adapted to have at least its major portion immersed in the heat exchange liquid in the casing for heating said heat exchange liquid, a heat exchange conductor within the vessel connected with the heater casing and defining a flow path through which the heat exchange liquid flows, said heat exchange conductor being in thermal juxtaposition with the fluid confining means so as to establish a heat exchange relationship therebetween, and means for generating heat within the firing unit to heat the latter and cause the heat exchange liquid to be heated and circulated whereby the heat exchange conductor and the body of water within the vessel and the emulsion stream are subjected to a substantially uniform heating action.

13. The combination as set forth in claim 12, wherein the heat exchange conductor is a coil within the vessel connected with the heater casing and defining a flow path through which the heat exchange liquid flows.

*14. An apparatus for a system of treating oil field emulsion streams which includes, a multi-compartment container adapted to contain a body of heated liquid in one compartment, means for maintaining said liquid at a predetermined liquid level, a conductor discharging the emulsion stream into said container, a hot fluid generator disposed in the compartment adapted to receive a body of heated liquid at least partially below the predetermined liquid level, the generator being adapted to be at least partially immersed in said body for heating said body and emulsion stream to break down the emulsion, a heating conductor in heat exchange relationship with another compartment of the vessel, said latter conductor being connected to the hot fluid generator for circulation of the hot fluid through said heating conductor, means for conducting the emulsion stream through the latter compartment for preheating prior to its discharge into the body of liquid, means for carrying off the water precipitated from the stream, and means for carrying off the clean oil.*

*15. For treating oil field emulsion streams, the combination with a multi-compartment vessel having one compartment adapted to contain a body of heated liquid, a conductor discharging the emulsion stream into said vessel, means for carrying off the water precipitated from the stream while maintaining a predetermined liquid level in the vessel, and means for carrying off the clean oil from the body of liquid, of an internal heater for the vessel including, a heater casing having upper and lower chambers disposed within the vessel below the liquid level therein so as to be at least partially immersed in the liquid contained therein, connections between the chambers for thermo-siphonic flow, a substantially non-corrosive heat exchange liquid contained within the heater casing, a firing unit immersed in the heat exchange liquid in the lower chamber, a preheater conductor in heat exchange relationship with another compartment of the vessel, said preheater conductor being connected into the heater casing for circulation of the heat exchange liquid through said preheater conductor, means for conducting the emulsion stream through the latter compartment for preheating prior to its discharge into the body of liquid, and means for burning a fuel within the firing unit to heat the latter and cause the heat exchange liquid to be heated and circulated whereby the body of liquid within the vessel and the emulsion stream are subjected to a substantially uniform heating action.*

*16. An apparatus for a system of treating oil field emulsion streams which includes, a multi-compartment container adapted to contain a body of heated liquid in one compartment, means for maintaining a predetermined liquid level in said compartment, a conductor discharging the emulsion stream into said container, a hot fluid generator in said compartment at least partially below the liquid level so as to be adapted to be at least partially immersed in said body for heating said body and emulsion stream for breaking down said emulsion into its components, a heating conductor in heat exchange relationship with another compartment of the vessel, said heating conductor being connected to the hot fluid generator for thermo-siphonic flow and having at least a portion above the hot fluid generator, means for conducting the emulsion stream through the latter compartment for preheating prior to its discharge through the body of liquid, means for carrying off the water precipitated from the emulsion stream, and means for carrying off the clean oil.*

*17. An apparatus for a system of treating oil field emulsion streams as set forth in claim 16, wherein the hot fluid generator includes, a heat-*

*er casing, a firing unit within the casing, a heat exchange fluid filling substantially the entire interior of that portion of the casing disposed within the vessel, and means for burning a fuel within the firing unit to heat the latter and cause the heat exchange fluid to be heated and circulated whereby the heating conductor and the body of liquid within the vessel and the emulsion stream are subjected to a substantially uniform heating action.*

*18. An apparatus for a system of treating oil field emulsion streams which includes, a multi-compartment container adapted to contain a body of heated liquid in one compartment, a conductor discharging the emulsion stream into said container, means for maintaining a liquid level in said compartment, a hot fluid generator in the compartment at least partially below the liquid level so as to be adapted to be at least partially immersed in said body for heating said body and emulsion stream for breaking down said emulsion into its components, an elongate heat exchange conductor in close thermal juxtaposition with another compartment of the vessel so as to establish a heat exchange relationship between the heat exchange conductor and said latter compartment, connections between the hot fluid generator and the heat exchange conductor for thermo-siphonic flow, means for conducting the emulsion stream through the second-named compartment for preheating prior to its discharge into the body of liquid, means for carrying off the water precipitated from the emulsion stream, and means for carrying off the clean oil.*

*19. An apparatus for a system of treating oil field emulsion streams as set forth in claim 18, wherein the hot fluid generator includes, a heater casing, a firing unit within the casing, a heat exchange fluid filling substantially the entire interior of that portion of the casing disposed within the vessel, and means for burning a fuel within the firing unit to heat the latter and cause the heat exchange fluid to be heated and circulated whereby the heat exchange conductor and body of liquid within the vessel and emulsion stream are subjected to a substantially uniform heating action.*

*20. For treating oil field emulsion streams, the combination with a vessel adapted to contain a body of heated liquid, fluid confining means associated with the vessel, an emulsion stream inlet conductor connected to the fluid confining means, a second conductor in communication with the fluid confining means and discharging the stream into said body of liquid, means for carrying off the water precipitated from the emulsion stream, and means for carrying off the clean oil from the vessel, of an internal heater for the vessel including a hot fluid generator disposed within the vessel and having at least its major portion disposed in the body of liquid, a heat exchange conductor connected with the hot fluid generator and defining a flow path through which hot fluid from the generator flows, said heat exchange conductor being in thermal juxtaposition with the fluid confining means so as to establish a heat exchange relationship therebetween, and means for generating heat within the internal heater to heat the latter and cause the hot fluid to be generated and circulated whereby the heat exchange conductor and the body of liquid within the vessel and the emulsion stream are subjected to a substantially uniform heating action.*

*21. An apparatus for treating by heat oil field well fluids including a water and oil emulsion which contains corrosive heat-unstable water and oil to break the emulsion comprising in combination, a vessel, a heat generating chamber positioned in said vessel, a burner for producing a heating flame in said chamber, means for protecting said chamber from the destructive action of the well fluids, preventing coking of said chamber, preventing damage of said chamber by overheating and for conducting heat from said chamber to the emulsion to be treated at a lower temperature than said chamber to minimize vaporization of the oil, said means comprising a liquid compartment surrounding said chamber adapted to contain a heat-stable liquid heat exchange medium to be heated by said chamber, the walls of said compartment being spaced from the walls of said chamber, an oil outlet from the interior of said vessel between the top and bottom thereof, a water outlet from the interior of said vessel below said oil outlet, and means for conducting oil field well fluids into the interior of said vessel into heat exchange relationship with said compartment.*

*22. An apparatus as set forth in claim 21 wherein the compartment is constructed to contain fresh water as the heat exchange medium and the heat generating chamber is constructed to vaporize said water to form steam within the compartment surrounding said chamber.*

CLARENCE O. GLASGOW.
JOSEPH L. MAHER.

REFERENCES CITED

The following references are of record in the file of this patent or the original patent:

UNITED STATES PATENTS

| Number | Name | Date |
|---|---|---|
| 526,600 | Wilson | Sept. 25, 1894 |
| 678,912 | Stanley et al. | July 23, 1901 |
| 690,426 | Hesse | Jan. 7, 1902 |
| 1,361,212 | Worley et al. | Dec. 7, 1920 |
| 1,396,889 | Sepulchre | Nov. 15, 1921 |
| 1,675,775 | Umbarger | July 3, 1928 |
| 1,710,665 | Mertzanoff | Apr. 23, 1929 |
| 1,781,057 | Elmwall | Nov. 11, 1930 |
| 2,110,432 | Watson | Mar. 8, 1938 |
| 2,156,123 | Mount | Apr. 25, 1939 |
| 2,181,687 | Walker | Nov. 28, 1939 |
| 2,232,546 | Marsh | Feb. 18, 1941 |
| 2,326,384 | Mount | Aug. 10, 1943 |
| 2,354,932 | Walker et al. | Aug. 1, 1944 |
| 2,388,796 | Mount | Nov. 13, 1945 |
| 2,418,015 | Donald et al. | Mar. 25, 1947 |
| 2,457,022 | Yula | Dec. 21, 1948 |
| 2,579,184 | Glasgow et al. | Dec. 18, 1951 |

FOREIGN PATENTS

| Number | Country | Date |
|---|---|---|
| 8,241 | Great Britain | Apr. 9, 1902 |
| 618,991 | Germany | Sept. 5, 1935 |